No. 772,754. Patented October 18, 1904.

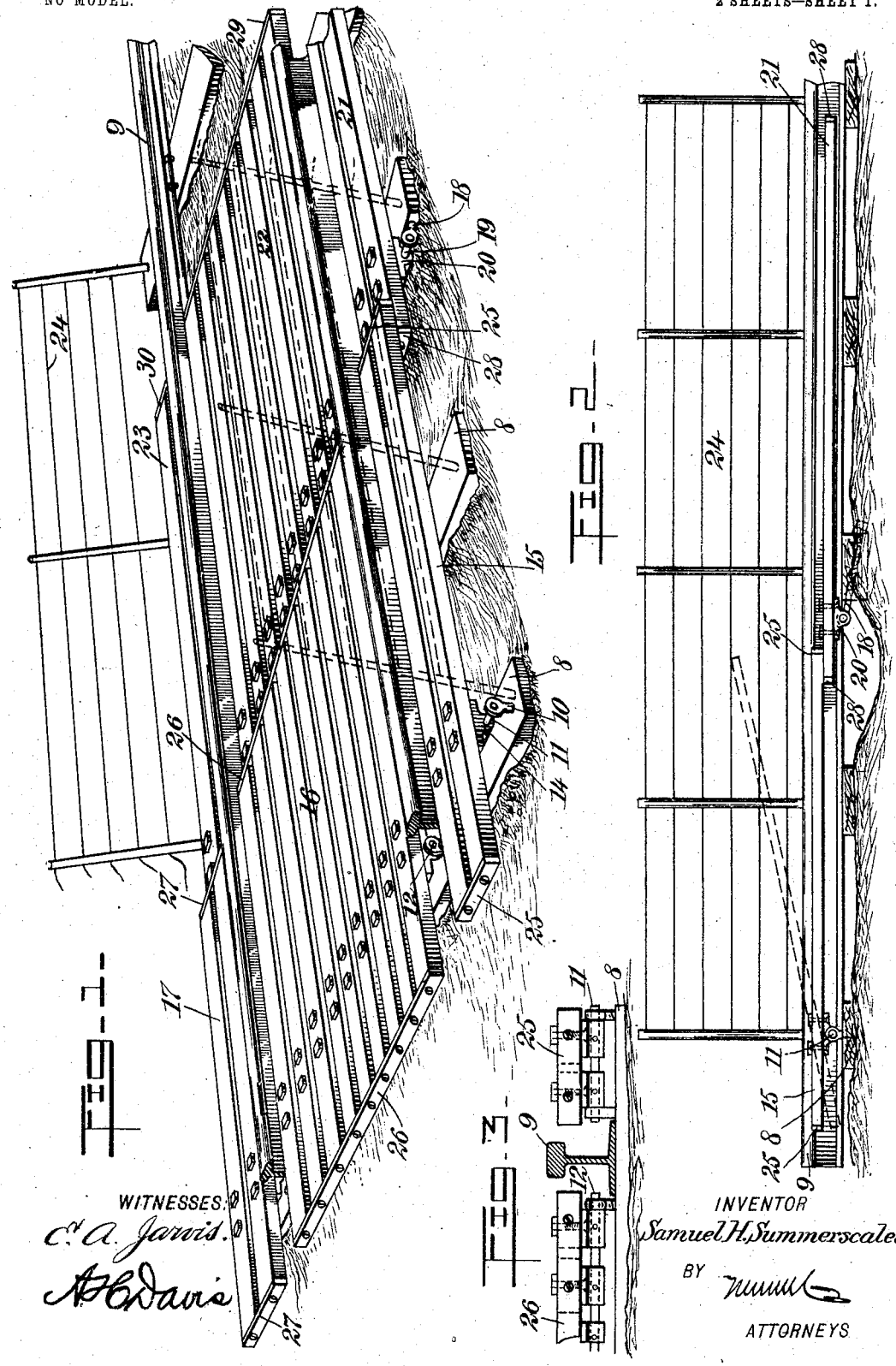

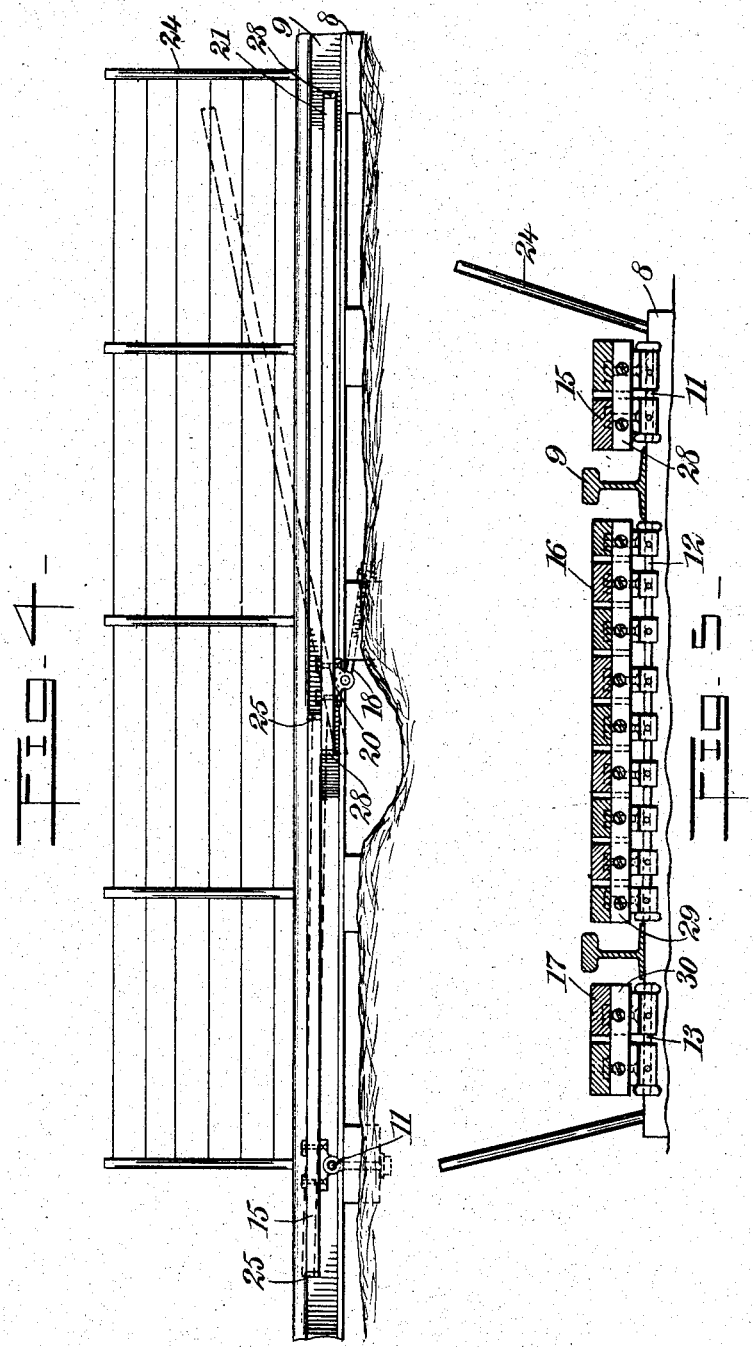

UNITED STATES PATENT OFFICE.

SAMUEL HENRY SUMMERSCALES, OF WINNIPEG, CANADA.

CATTLE-GUARD.

SPECIFICATION forming part of Letters Patent No. 772,754, dated October 18, 1904.

Application filed February 12, 1904. Serial No. 193,320. (No model.)

*To all whom it may concern:*

Be it known that I, SAMUEL HENRY SUM-MERSCALES, a subject of the King of Great Britain, and a resident of Winnipeg, in the Province of Manitoba and Dominion of Canada, have invented a new and Improved Cattle-Guard, of which the following is a full, clear, and exact description.

My invention relates to cattle-guards for preventing cattle from straying onto railroads from public crossings and the like.

The objects of my invention are to provide means for frightening cattle away from such crossings and effectually preventing their passage over them.

Reference is to be had to the accompanying drawings, forming a part of this specification, in which similar characters of reference indicate corresponding parts in all the figures.

Figure 1 is a perspective view of a preferred form of my invention applied to a railway. Fig. 2 is a side view of the same. Fig. 3 is an end view, partly in section, on an enlarged scale. Fig. 4 is a view similar to Fig. 2, with the parts shown in different positions; and Fig. 5 is a transverse sectional view.

In the drawings, 8 represents railway-ties, and 9 represents the rails. Attached to one of the ties is a series of ring-headed bolts 10, in which are adapted to turn rods 11, 12, and 13, passing lengthwise of the tie. Upon the rods are placed clamps 14, which are secured by bolts or in any other desired manner to front platforms 15, 16, and 17, thus pivoting these platforms to the rods 11, 12, and 13, near the ends of the platforms. The platforms 15 and 17 are placed on the outside of the rails, and the platform 16 is placed between the rails. Upon another tie is placed a series of ring-headed bolts 18, similar to the ring-headed bolts 10, but attached to the side of the tie instead of the top. In the heads of these bolts is placed a rod 19, which extends from one end of the tie to the other and carries clamps 20, attached to rear platforms 21, 22, and 23, as shown. This construction causes the platforms 21, 22, and 23, all fixedly secured to the rod 19, to all turn together when one of them is caused to swing with said rod. The front ends of the platforms 15 16 17 are adapted to rest on the rear ends of the platforms 21, 22, and 23, as shown.

24 is a fence placed along the railroad for preventing cattle from crossing the tracks.

Upon the ends of the platforms 15 16 17 are placed wire or steel guards 25, 26, and 27, and in like manner guards 28, 29, and 30 are placed on the ends of the platforms 21, 22, and 23.

The operation of this device is very simple. When an animal steps upon the rear end of any of the platforms 15, 16, or 17, the other end will fly up in front of it and tend to frighten it away; but if this is not effective and the animal proceeds to step upon the part of the same platform or one of the other platforms 15 16 17, which is beyond the rods 11, 12, and 13, the weight brought to bear upon the rear end of one of the platforms 21, 22, and 23 will cause all three of them to rise in front of the animal, and thus effectually scare the animal off.

It will be noted that the rod 19 is nearer the rear end of the platforms 21 22 23 than are the rods 11, 12, and 13 with respect to the platforms 15 16 17. By this arrangement the former platforms will rise higher than the latter ones, and thus more effectually accomplish the purpose.

I do not wish to limit myself to the exact construction shown in the drawings, as many modifications may be made therein without departing from the scope of my invention as set forth in the claims.

Having thus described my invention, I claim as new and desire to secure by Letters Patent—

1. A cattle-guard comprising a pivoted platform extending beyond its pivotal point in two directions, and a second pivoted platform supporting one end of said first-mentioned platform; one of the projecting ends of said first-mentioned platform constituting means for tilting the latter, and the other end constituting means for tilting said second platform in the same direction as the first.

2. A cattle-guard comprising two series of pivoted platforms, and means for causing the rear ends of both of them to be tilted upwardly on their pivots by the application of weights to one of them.

3. A cattle-guard comprising two series of pivoted platforms located in contact with each other, and means for causing both of said platforms to be tilted upwardly upon their pivots upon the application of pressure to different points of one of said platforms.

4. The combination of a plurality of rods, a plurality of platforms each pivoted at a point intermediate of its ends on one of said rods, an additional oscillatable rod, and a plurality of platforms fixedly mounted on said additional rod; the first series of platforms resting on the ends of the second series of platforms, whereby both platforms may be tilted on their pivots in the same direction.

5. The combination of a series of platforms independently pivoted at a point intermediate of their ends, an oscillatable rod, and a series of platforms fixed to said rod; each of said first-mentioned platforms resting at one end upon an end of one of the last-mentioned platforms, this arrangement constituting means whereby pressure applied to the first-mentioned platforms may cause either of said series of platforms to tilt on their pivots in the same direction.

In testimony whereof I have signed my name to this specification in the presence of two subscribing witnesses.

SAMUEL HENRY SUMMERSCALES.

Witnesses:
   FRED. H. STEWART,
   L. L. GULLIVAN.